(12) United States Patent
Hennes et al.

(10) Patent No.: US 6,264,422 B1
(45) Date of Patent: Jul. 24, 2001

(54) APPARATUS AND METHOD FOR ASSEMBLING ITEMS ONTO A PALLET

(75) Inventors: Youssef Y. Hennes, Littleton; Wojciech Karpala, Lakewood; Thomas R. Stem; Jerry Williams, both of Broomfield, all of CO (US)

(73) Assignee: Zygot Automation Inc., Englewood, CO (US)

( * ) Notice: Subject to any disclaimer, the term of this patent is extended or adjusted under 35 U.S.C. 154(b) by 0 days.

(21) Appl. No.: 09/234,589

(22) Filed: Jan. 21, 1999

(51) Int. Cl.[7] .......................... B65G 57/03; B65H 29/00
(52) U.S. Cl. ................................ 414/792.7; 414/791.6; 414/794.2; 414/794.3; 414/793.4; 414/802
(58) Field of Search ......................... 414/799, 792.7, 414/793.4, 794.2, 794.6, 789.1, 793.8, 791.6, 794.3, 907, 788.9; 198/370.1; 53/447, 535

(56) References Cited

U.S. PATENT DOCUMENTS

| | | | |
|---|---|---|---|
| 2,796,179 | * | 6/1957 | Van Vleck ...................... 414/793.4 |
| 2,813,638 | * | 11/1957 | Miller, Jr. ....................... 414/790.3 |
| 2,875,907 | * | 3/1959 | Locke et al. .................. 414/791.6 X |
| 3,164,080 | * | 1/1965 | Miller, Jr. .................... 414/793.4 X |
| 3,700,127 | * | 10/1972 | Kurk et al. ........................... 414/802 |
| 4,000,820 | * | 1/1977 | Kurk et al. .................... 414/792.1 X |
| 4,022,334 | * | 5/1977 | Lassig ............................. 414/793.4 |
| 4,024,965 | * | 5/1977 | Marth et al. .................. 414/792.4 X |
| 4,073,387 | * | 2/1978 | Bowser ......................... 414/793.4 X |
| 4,108,061 | * | 8/1978 | Bowser .......................... 414/791.6 X |
| 4,426,184 | * | 1/1984 | Boyland ............................ 414/802 X |
| 4,439,084 | * | 3/1984 | Werkheiser .................... 414/794.2 X |
| 4,536,119 | * | 8/1985 | Miaskoff ........................... 414/792.4 |
| 4,708,564 | * | 11/1987 | Mylrea et al. ................. 414/793.4 X |
| 4,712,975 | * | 12/1987 | Salts .............................. 414/795.3 X |
| 4,730,718 | * | 3/1988 | Fazio et al. ........................ 198/370.1 |
| 4,774,799 | * | 10/1988 | Durant ........................... 414/793.4 X |
| 4,778,323 | * | 10/1988 | Salts ................................... 414/795.3 |
| 5,181,820 | * | 1/1993 | Sjogren et al. ................. 414/794.2 X |
| 5,609,236 | * | 3/1997 | Neukam ............................ 198/370.1 |

* cited by examiner

*Primary Examiner*—Robert P. Olszewski
*Assistant Examiner*—Thuy V. Tran
(74) *Attorney, Agent, or Firm*—Donald W. Margolis; Emery L. Tracy

(57) ABSTRACT

An item layer assembly apparatus for continuously receiving items from an infeed conveyor, forming an item layer from a plurality of items, and loading the item layer onto a pallet is provided. The item a layer assembly apparatus comprises an item receiving area surface for continuously receiving the items from the infeed conveyor. At least one side plate area surface is adjacent and substantially horizontally planar to the item receiving area surface for receiving the items from the item receiving area surface. A item layer forming plate receives the items from each of the side plate area surfaces with the item layer forming plate positioned substantially under the item receiving area surface. A mechanism associated with the item layer forming plate forms a substantially rectilinear package layer wherein the item layer forming plate deposits the item layer onto the pallet.

11 Claims, 13 Drawing Sheets

APPARATUS AND METHOD FOR ASSEMBLING ITEMS ONTO A PALLET

BACKGROUND OF THE INVENTION

1. Field of the Invention

This invention relates generally to an item handling apparatus and method for assembling items onto a pallet in a layer, and, more particularly it relates to an item handling apparatus and method for uninterrupted, continuous, loading and stacking of layers of items onto a pallet in a multi-tiered stack.

2. Description of the Prior Art

Various automated palletizers have heretofore been developed for stacking solid material items, such as bags, packages, boxes, bales, rocks, and other like objects on to pallets or other supports. Generally, in the prior and current art, items, for example bags, are conveyed to the palletizer from a moving infeed conveyor. Once at the palletizer they are usually oriented at a loading area to form a single layer of bags in a desired pattern. Once the layer is formed in the desired pattern, it is then usually squared and transferred to stripper or draw plates which are separable for depositing the layer of bags onto a pallet or other support which is located below the strip plates, and which is usually elevated, for example on a pallet elevator. However, the moving infeed conveyor for loading and stacking layers of items at the loading area is interrupted and discontinuous due to the current methods and mechanisms for transferring the items from the infeed conveyor, and for orienting and squaring them. The elevated pallet is then lowered in increments by the pallet elevator as the bags are continuously stacked in layers, often of alternating patterns for stability, until a full pallet load is obtained.

Attempts have been made in the past to improve automated palletizers. But even in those instances, the flow of the items has not been made continuous.

Accordingly, there exists a need for an item handling palletizer apparatus and method for uninterrupted, continuous, loading and stacking of layers of items from an infeed conveyer onto a pallet or other support in a multi-tiered stack.

SUMMARY OF THE INVENTION

It is therefore an object of the of the present invention to provide an item handling palletizer apparatus and method for uninterrupted, continuous, loading and stacking of layers of items from an infeed conveyer onto a pallet or other support in a multi-tiered stack.

The present invention is an item layer assembly apparatus for receiving items from an infeed conveyor, forming an item layer from a plurality of items, and loading the item layer onto a pallet or other support. The item layer assembly apparatus comprises an item receiving area surface for continuously receiving items from the moving infeed conveyor. At least one side plate area surface, but preferably two or more, is adjacent and substantially horizontally planar to the item receiving area surface for continuously receiving the items from the item receiving area surface. A layer forming plate intermittently receives the items from the one or more side plate area surfaces, the layer forming plate being positioned directly below, or below and adjacent to the item receiving area surface. A mechanism associated with the layer forming plate is provided to form a substantially rectilinear item layer, after which the layer forming plate deposits the formed item layer onto a pallet or other support.

In one preferred embodiment of the present invention, the item receiving area surface includes a plurality of rollers. Preferably, the item layer assembly apparatus further comprises a rotatable belt member between each pair of rollers with the rotatable belt positioned to make contact with the items to move the items to one of the side plate area surfaces, although alternatively, a pusher mechanism may be used to move the items to one of the side plate area surfaces.

In another preferred embodiment of the present invention, there are two side plate area surfaces, and each of the side plate area surfaces receives a partial item layer, although alternatively, each of the side plate area surfaces may receive a compete item layer.

In still another preferred embodiment of the present invention, the item layer assembly apparatus further comprises a first side plate area surface and a second side plate area surface. Preferably, each of the side plate area surfaces includes a conveyor system, although alternatively, each of the side plate area surfaces may include a roller assembly, or any other conveying mechanism.

In yet another preferred embodiment of the present invention, the item layer assembly apparatus further comprises a pivot mechanism on each of the side plate area surfaces for moving one side of each of the side plates adjacent the layer forming plate, although alternatively, the item layer assembly apparatus further comprises a mechanism for lowering each side plate area surface substantially horizontally planar to the layer forming plate.

In still yet another embodiment of the present invention, the layer forming plate includes an art known first plate and a second plate. Preferably, the first plate and the second plate are retractable for depositing the item layer on the pallet or other support.

In another preferred embodiment of the present invention, the item layer assembly apparatus further comprises a pallet elevator system for raising the pallet to a position adjacent to and below the layer forming plate, although alternatively, the item layer assembly apparatus further comprises a mechanism for lowering the layer forming plate to a position adjacent to and above the pallet or other support, and then raising the layer forming plate to receive the items from each of the raised side plate area surfaces.

In still another preferred embodiment of the present invention, the item layer assembly apparatus further comprises a programmable controller for controlling the operation of the item layer assembly apparatus.

The present invention further includes a preferred method for continuously receiving items from an infeed conveyor, forming an item layer from a plurality of items, and loading the item layer onto a pallet or other support. The method comprises continuously receiving the items on a layer forming conveyor from the infeed conveyor, transferring the items from the layer forming conveyor to at least one side area surface, transferring the items from the side area surface to a layer forming plate, forming a substantially rectilinear item layer, and depositing the item layer on a pallet or other support.

In another preferred embodiment of the present invention, the method further comprises pivoting one side of the side area surfaces to move the side adjacent the layer forming plate, although alternatively, the method further comprises lowering the side area surface substantially horizontally planar to the layer forming plate.

In still another preferred embodiment of the present invention, the method further comprises retracting the layer forming plate in order to deposit the item layer on the pallet or other support.

In yet another preferred embodiment of the present invention, the method further comprises raising the pallet to a position adjacent to and below the layer forming plate, although alternatively, the method further comprises lowering the layer forming plate above and adjacent the pallet or other support, and raising the layer forming plate to receive the items from each of the side plate area surface.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE PREFERRED EMBODIMENTS

Figure 1:
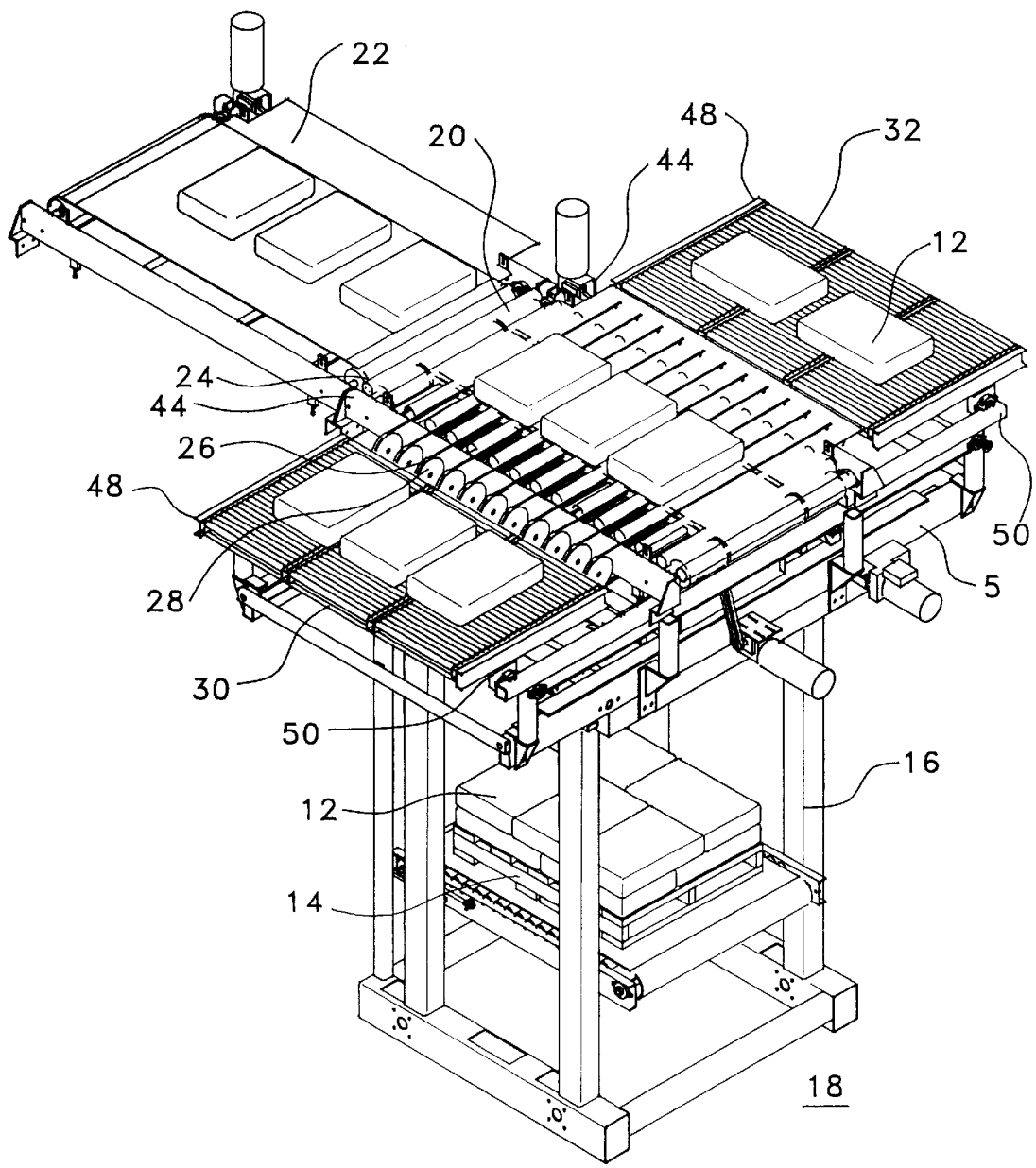
FIG. 1 is a perspective view illustrating a material handling apparatus for assembling an item layer onto a pallet in a multi-tiered stack, constructed in accordance with the present invention with the material handling apparatus in a first stage.

The present invention teaches apparatus, indicated generally at 10, for assembling items 12 in an item layer onto a pallet 14, or the like, in an item layer, and to methods of doing the same. As used herein, the term "pallet" means pallets and other movable support structures, and equivalents thereof The item assembling apparatus 10 can assemble a variety of different types of items 12. As used herein, "items" include, but are not limited to solid objects, such as bags, packages, boxes, bales, rocks, and other like solid objects, and equivalents thereof. Generally, items 12, say packages as illustrated, are arranged in five-package layers in predetermined, stable patterns item layered on a pallet 14. Multi-tiered item layer stacks of packages are arranged in alternating patterns. It is noted, however, that while the item assembling apparatus 10 is and will be described and illustrated as arranging items 12 in five-package item layers, as described below, it is within the scope of the present invention to have the item assembling apparatus 10 arrange the items 12 in a variety of multi-package item layers and configurations, including, but not limited to, seven-package layers, nine-package layers, and the like.

The item assembling apparatus 10 of the present invention has a frame 16 supported by a frame supporting surface 18. The frame supporting surface 18 is preferably the floor of a manufacturing facility, the ground, or other substantially horizontal surface. As further illustrated in FIG. 1, the item assembling apparatus 10 is illustrated and, generally stated, comprises an item receiving area having a surface conveyor 20 for receiving items from a continuously moving infeed conveyor. As detailed below, item receiving conveyor 20 and its related apparatus continuously receives a partial layer or a complete layer of items 12 from infeed conveyor 22. The frame 16 supports layer forming conveyor 20 above frame supporting surface 18. The infeed conveyor 22 transports items 12 from an item loading system (not shown) or package storage area (not shown). The infeed conveyor 22 meters the deposit of items 12 on layer forming conveyor 20 to deposit items 12 at a controlled rate. A control circuit (not shown) which includes, but is not limited to, photoelectric devices for counting items 12 at infeed conveyor 22 and automatically transfers appropriate amount of items 12 to deposit items 12 in a layer pattern.

Intermediate item infeed conveyor 22 and item receiving conveyor 20, a state-of-the-art known item turner, not shown, may be provided to turn items 12 901, 1801 or 2701 in order to orient groups of items 12 to produce a desired layer pattern. As illustrated in FIG. 1, items 12 are deposited on item receiving conveyor 20 in either three-package or two-package sets with one three-package set and one two-package set forming a complete layer of items 12, as discussed below. The three item package set is preferably oriented in such a manner that each package 12 of the three item set is approximately perpendicular to infeed conveyor 22, while the two-package set is preferably oriented in such a manner that each package 12 of the two item set is approximately parallel to infeed conveyor 22.

Figure 2:
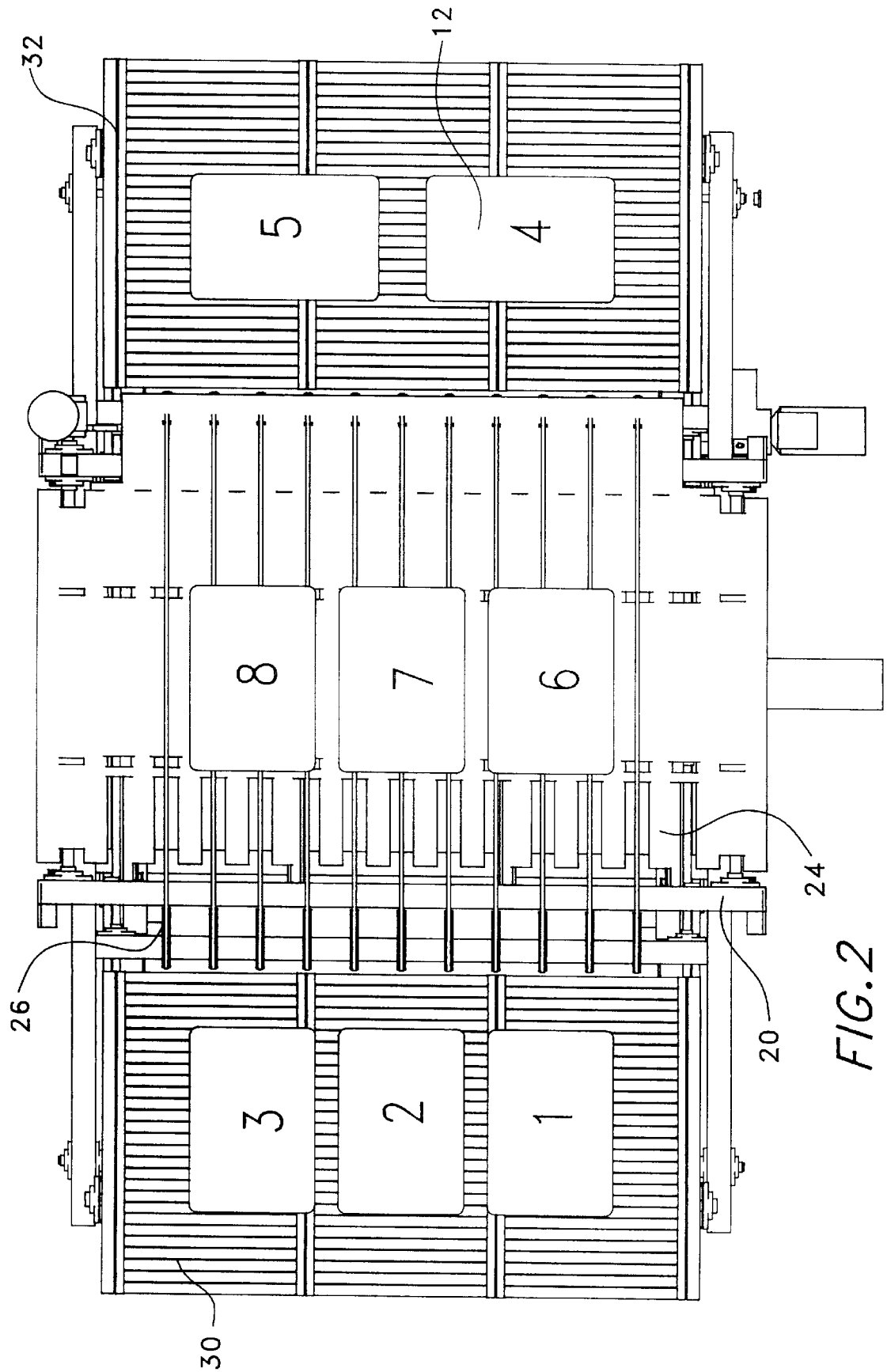
FIG. 2 is an enlarged top plan view illustrating the material handling apparatus of FIG. 1.
Figure 3:
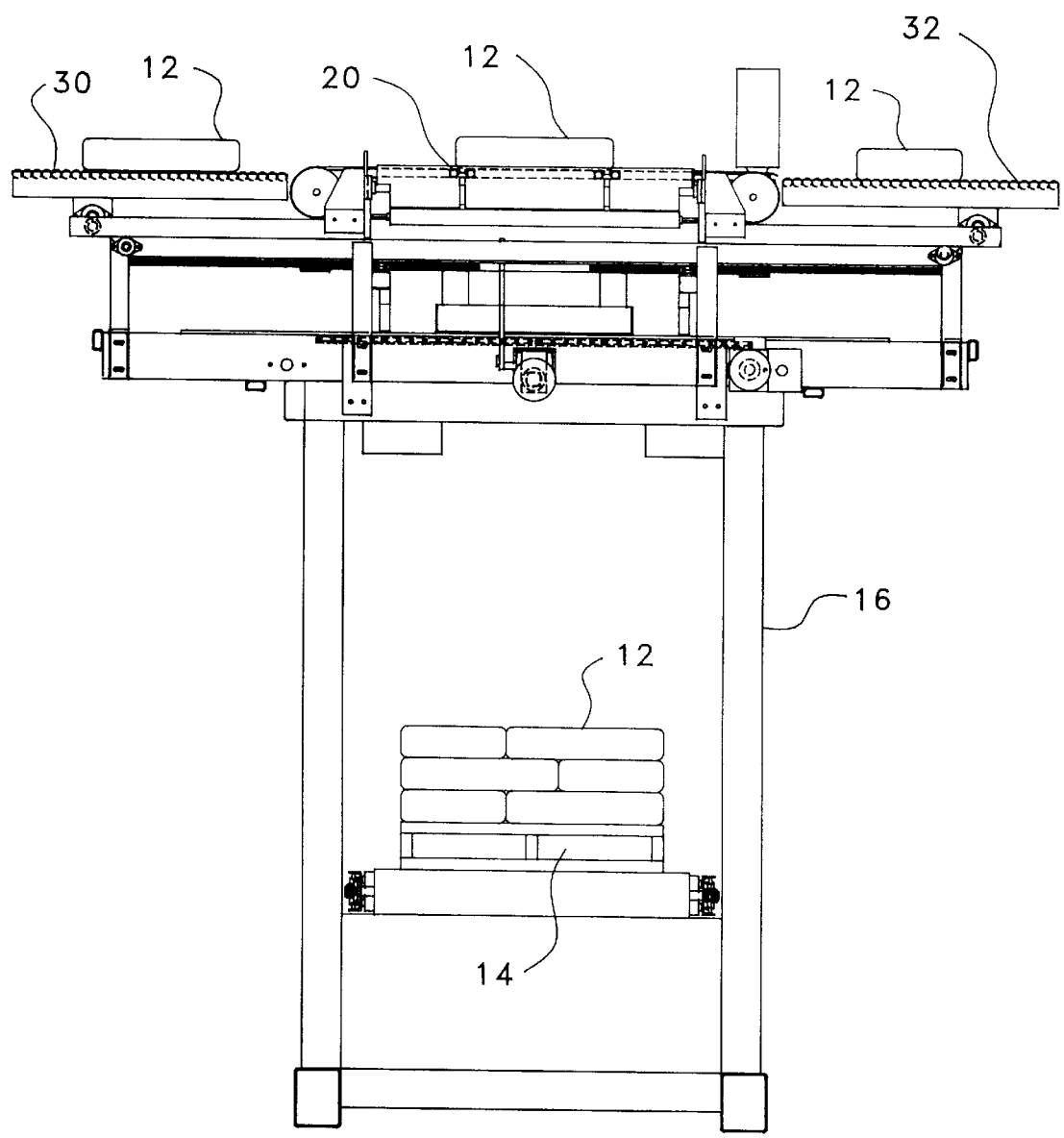
FIG. 3 is a side elevational view illustrating the material handling apparatus of FIG. 1, constructed in accordance with the present invention.
Figure 4:
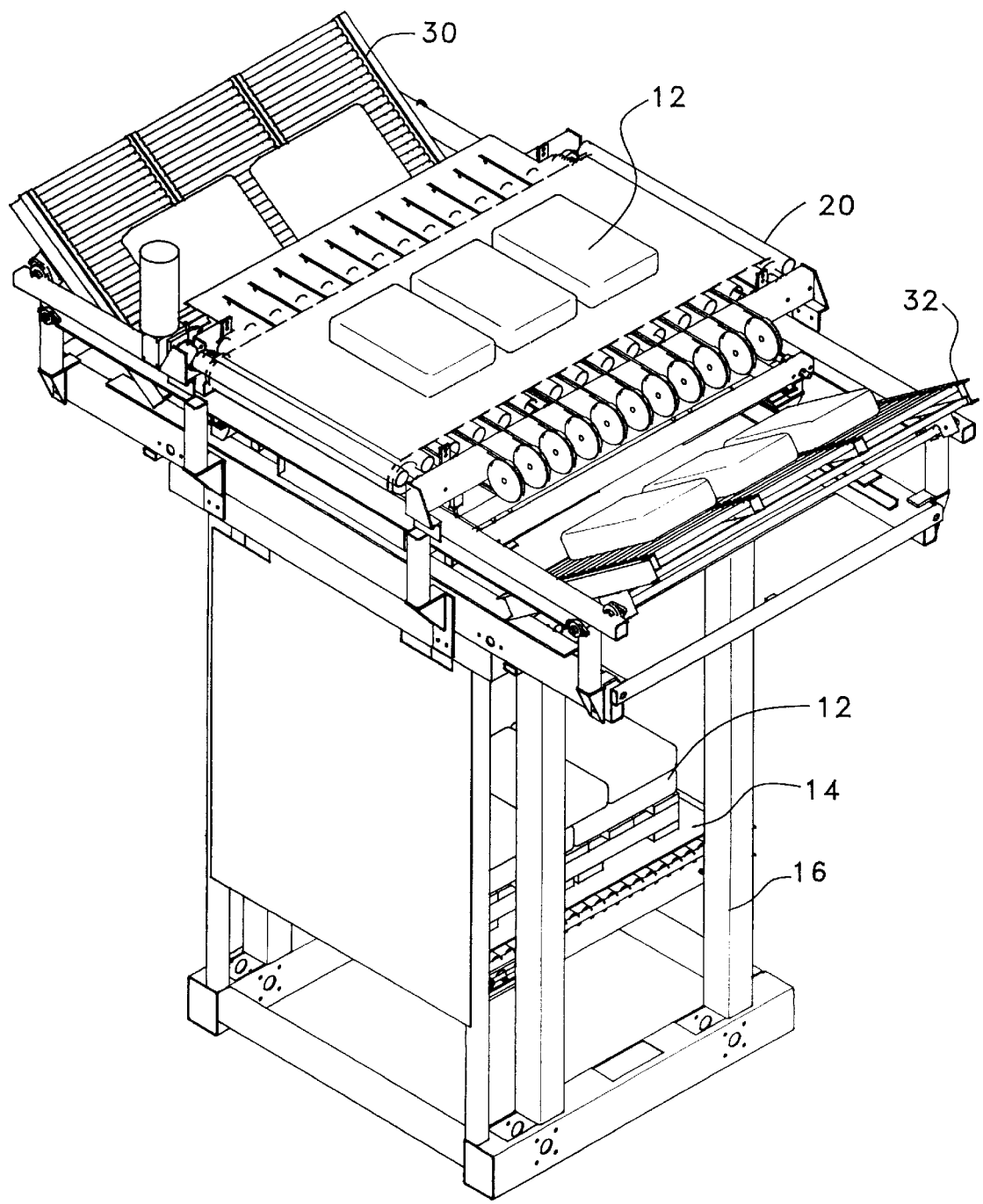
FIG. 4 is a perspective view illustrating the material handling apparatus of FIG. 1 in a second stage, and showing the side plates pivoting in order to slide items from the side area surface onto the layer forming plate to form an item layer thereon.
Figure 5:
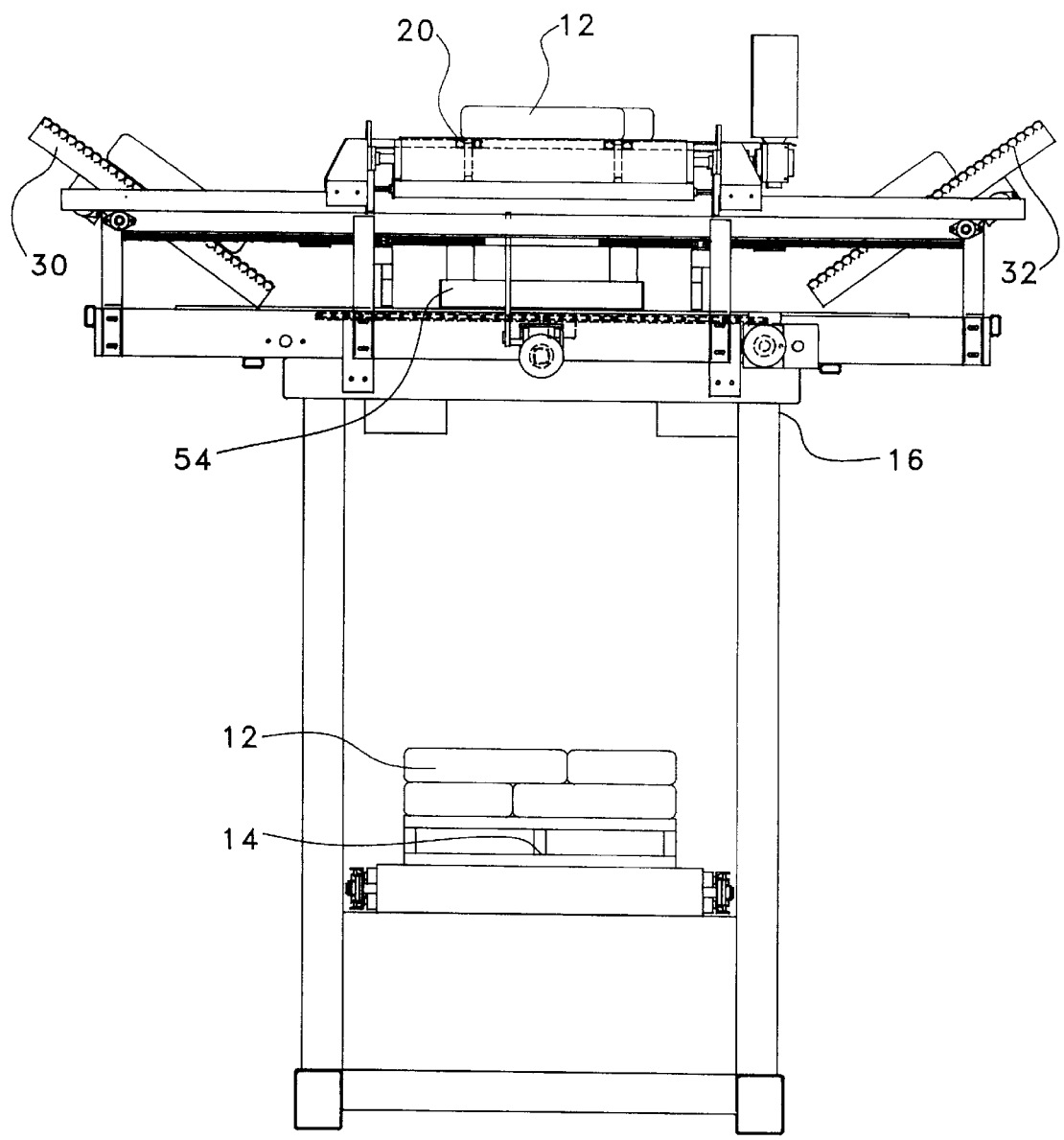
FIG. 5 is a side elevational view illustrating the material handling apparatus of FIG. 4 in a second stage.

For purposes of further discussion, in the embodiment of the present invention, a typical initial orientation of items 12 is as illustrated in FIGS. 1 and 2 each item layer comprises a five item package layer. The pattern shown comprises a first row of three items, numbered 1, 2 and 3, lined together side by side on a first side plate 30, and a second row of two items, numbered 4, and 5 on a second side plate 32, butted together to form a pattern having a generally rectilinear peripheral configuration. First side plate 30 and second side plate 32 are substantially horizontally planar to item receiving conveyor 20, with one edge of each side plate substantially adjacent to item receiving conveyor 20. During forming and item layering of the item layers by the item assembling apparatus 10, items 12 are arranged in two alternating patterns, as is known in the art, with the item layer pattern illustrated in FIGS. 1 and 2 being reversed to the pattern illustrated in FIG. 1 on every other package item layer. The parting surfaces between adjacent items 12 on each package layer are thus staggered, as illustrated in the loaded pallet illustrated in FIG. 1, to help stabilize the loaded pallet and form a substantially stable load. As mentioned, alternatively, the item layer assembling apparatus 10 can be operated to stack items 12 in package item layers having any desired number of items 12. Depending on the size of items 12, other typical package layer patterns of three, four, six, seven, eight or any other number of items can also be utilized.

In preferred embodiments of the present invention, item receiving area having conveyor 20 includes a plurality of freely rotating or driven rollers 24 oriented substantially perpendicular to infeed conveyor 22. Between each roller 24 is a belt member 26 substantially parallel to rollers 24, each belt member 26 being supported between a pair of driven wheels 28. The wheels 28 are preferably driven by a motor, or the like motive force for driving and rotating belt members 26 in alternating directions. Once the partial or complete layer of items 12 are positioned on item receiving area conveyor 20, belt members 26 are rotated in alternating directions generally perpendicular to infeed conveyor 22 to alternatingly transfer items 12 to either first side plate 30 or a second side plate 32, as described below in greater detail.

Figure 6:
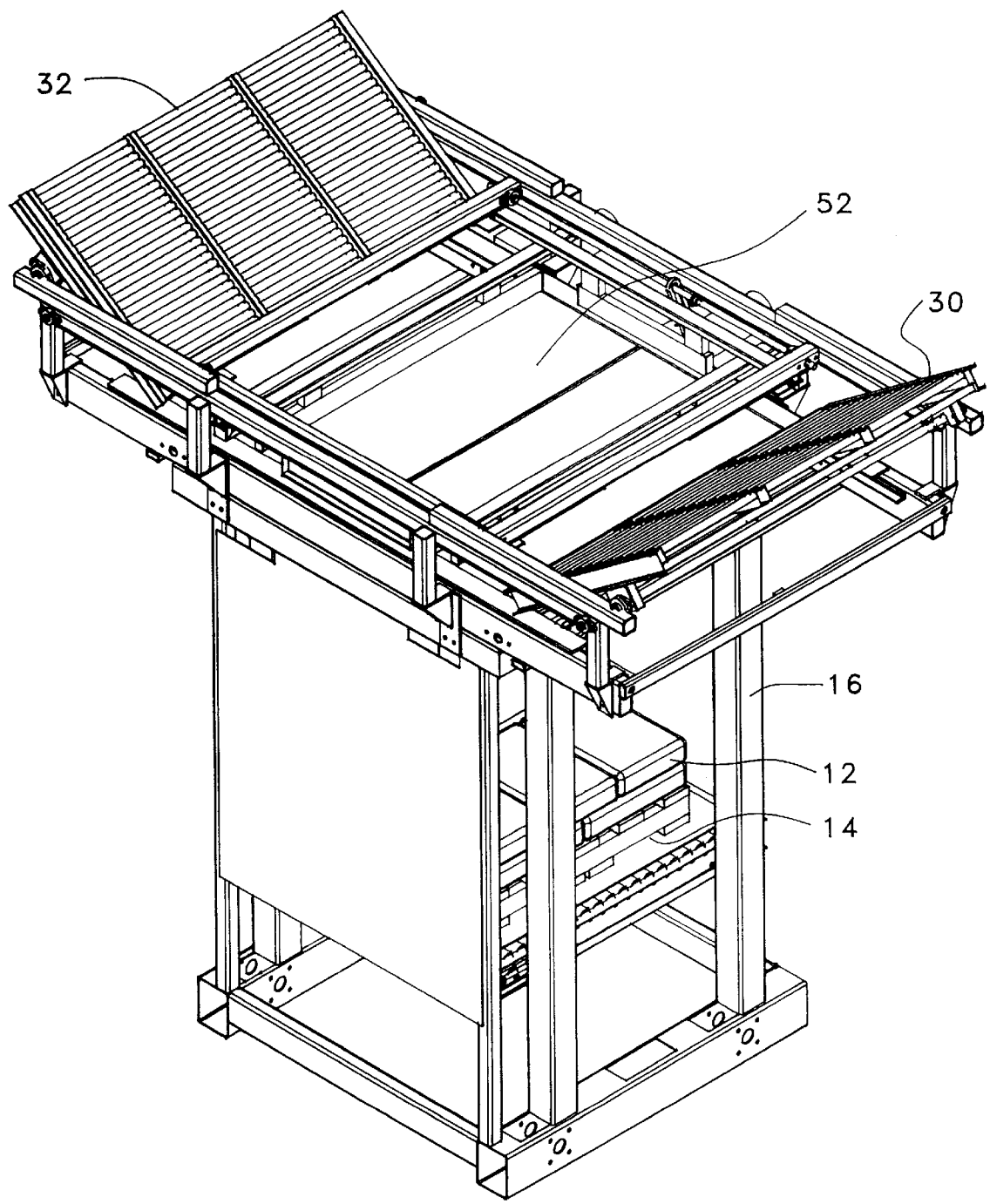
FIG. 6 is a perspective view illustrating the material handling apparatus of FIG. 1 in a third stage.
Figure 7:
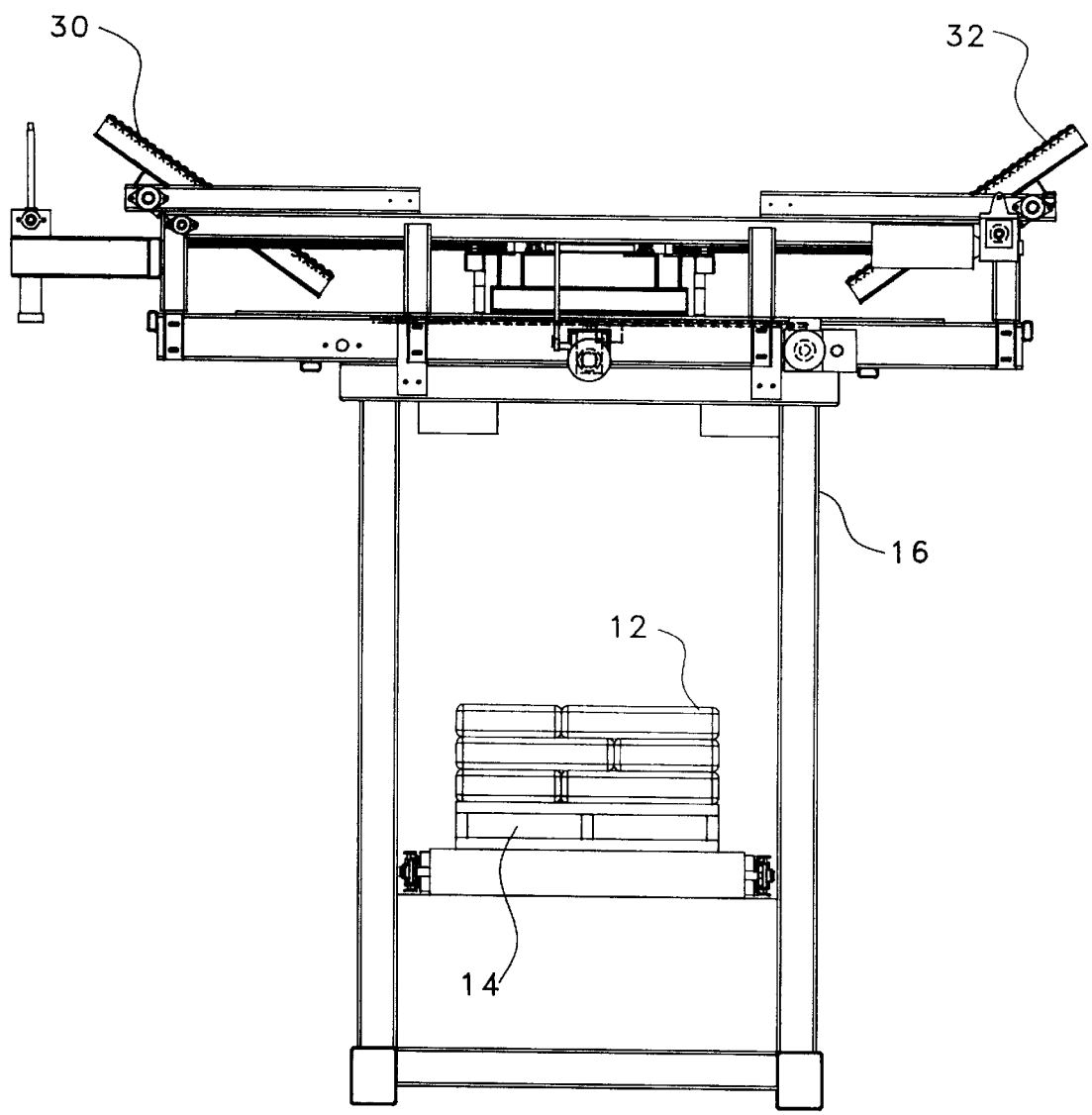
FIG. 7 is a side elevational view illustrating the material handling apparatus of FIG. 6 in a third stage.

In an embodiment of the item assembling apparatus 10 of the present invention, as illustrated in FIGS. 1–7, first side plate 30 and second side plate 32 comprise a pivot mechanism 50 for lowering the sides of first side plate 30 and second side plate 32 adjacent item receiving conveyor 20 to a level generally below the level of item receiving conveyor 20 and above frame supporting surface 18. Once a predetermined number of items 12 are positioned on first side plate 30 and second side plate 32, the side of first side plate 30 adjacent the item receiving conveyor 20 and the side of second side plate 32 adjacent item receiving conveyor 20 is pivoted downwardly by action of any suitable art known drive, such as an air cylinder, to a position below item receiving conveyor 20. The first side plate 30 and second side plate 32 include a state-of-the-art sensor for actively sensing when the partial package layer or the complete package layer has been deposited on first side plate 30 and/or second side plate 32. Once the sensor senses the partial package layer or the complete package layer on first side plate 30 and/or second side plate 32, conveyor system 48 of first side plate 30 and second side plate 32 is then activated to transfer items 12, with the assistance of gravity, to item layer forming plates 52, as illustrated in FIG. 6, preferably located directly underneath item receiving conveyor 20. Once items 12 have been transferred to item layer forming plates 52, first side plate 30 and second side plate 32 are raised, for example by action of an air cylinder into their substantially horizontal position to receive another partial package layer or complete package layer from item receiving conveyor 20.

As illustrated in FIGS. 3 and 5–7, the item assembling apparatus 10 further includes a squaring mechanism 54 associated with item layer forming plates 52 for "squaring" the item layer patterns which have been deposited on item layer forming plates 52. The squaring mechanism 54 comprises four movable squaring plates 56 on each of four sides of item layer forming plates 52. The squaring plates 56 are mounted on a frame system 58 and arranged in a manner which allows them to contact items 12 in the item layer forming plates 52, and form the item layer resting on item layer forming plates 52 into a substantially rectilinear shape.

In operation, once items 12 are squared on item layer forming plates 52, a pallet 14 is moved in a generally upward direction away from the frame supporting surface 18 and toward item layer forming plates 52. In an alternative embodiment, item layer forming plates 52 are moved in a generally downward direction away from item receiving conveyor 20 and toward frame supporting surface 18. As is known in the art, once item layer forming plates 52 are adjacent to pallet 14, item layer forming plates 52 retract in a generally outward direction from underneath the formed package layer depositing the formed package layer onto pallet 14 located directly under item layer forming plates 52. The pallet 14 is then lowered, or item layer forming plates 52 is raised, into a position directly beneath item receiving conveyor 20 for continuously receiving next layer of items 12 from first side plate 30 and second side plate 32. The process continues until pallet 14 has a full load of layers of items 12, whereupon pallet 14 is discharged, and a new pallet 14 is positioned to continue to continue the loading process.

Figure 8:
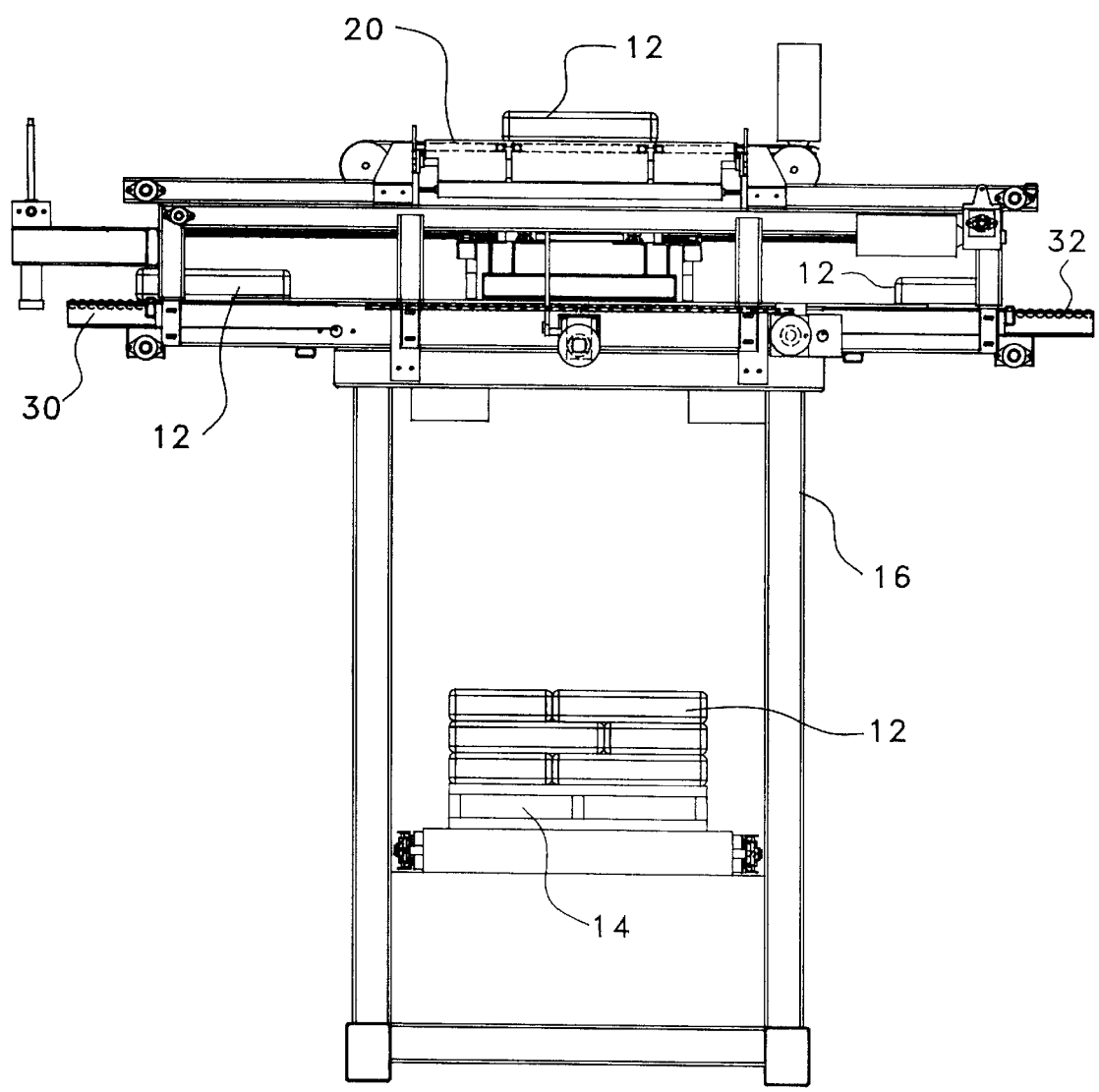
FIG. 8 is a perspective view illustrating another embodiment of the material handling apparatus for assembling an item layer onto a pallet in a multi-tiered stack, constructed in accordance with the present invention, showing the side plates lowered to the level of the layer forming plate so that items may be moved from the side area surfaces onto the layer forming plate to form an item layer thereon.
Figure 9:
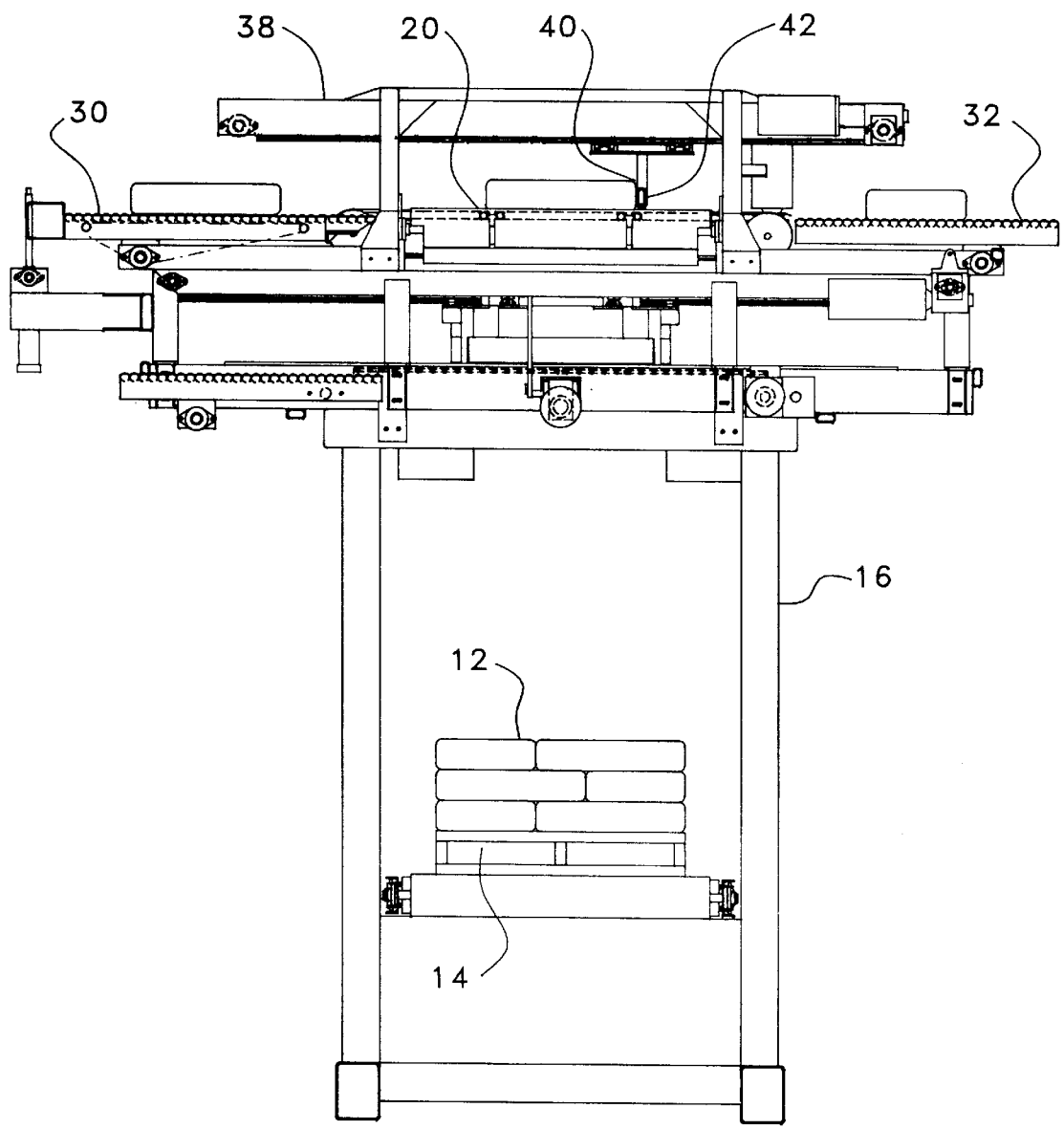
FIG. 9 is a side elevational view illustrating still another embodiment of the material handling apparatus for assembling an item layer onto a pallet in a multi-tiered stack, constructed in accordance with the material handling apparatus, and using a pusher mechanism to move items to the side plate area surfaces.
Figure 10:
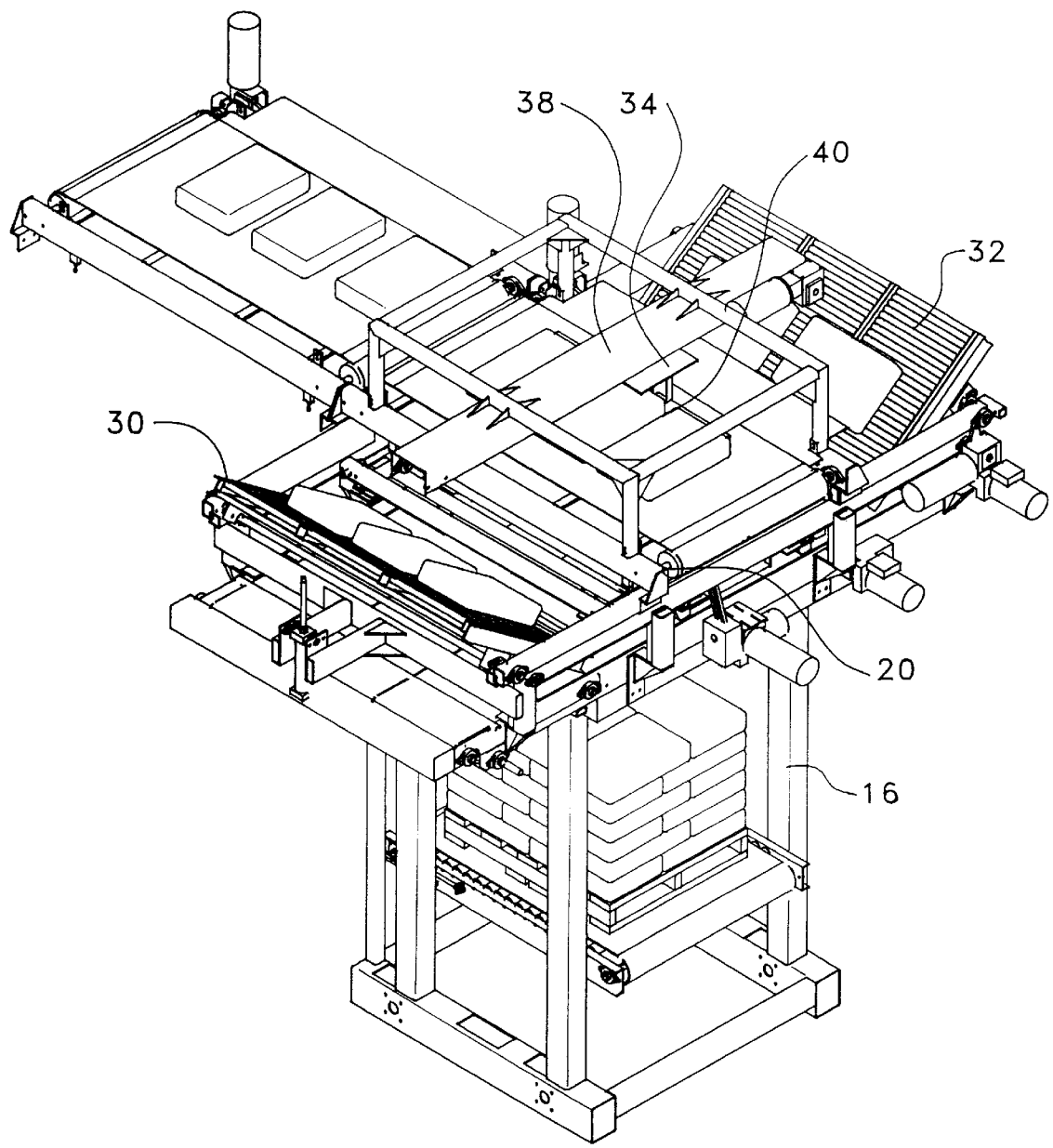
FIG. 10 is a perspective view of still another embodiment of the material handling apparatus for assembling an item layer onto a pallet in a multi-tiered stack, constructed in accordance with the material handling apparatus of FIG. 9.
Figure 11:
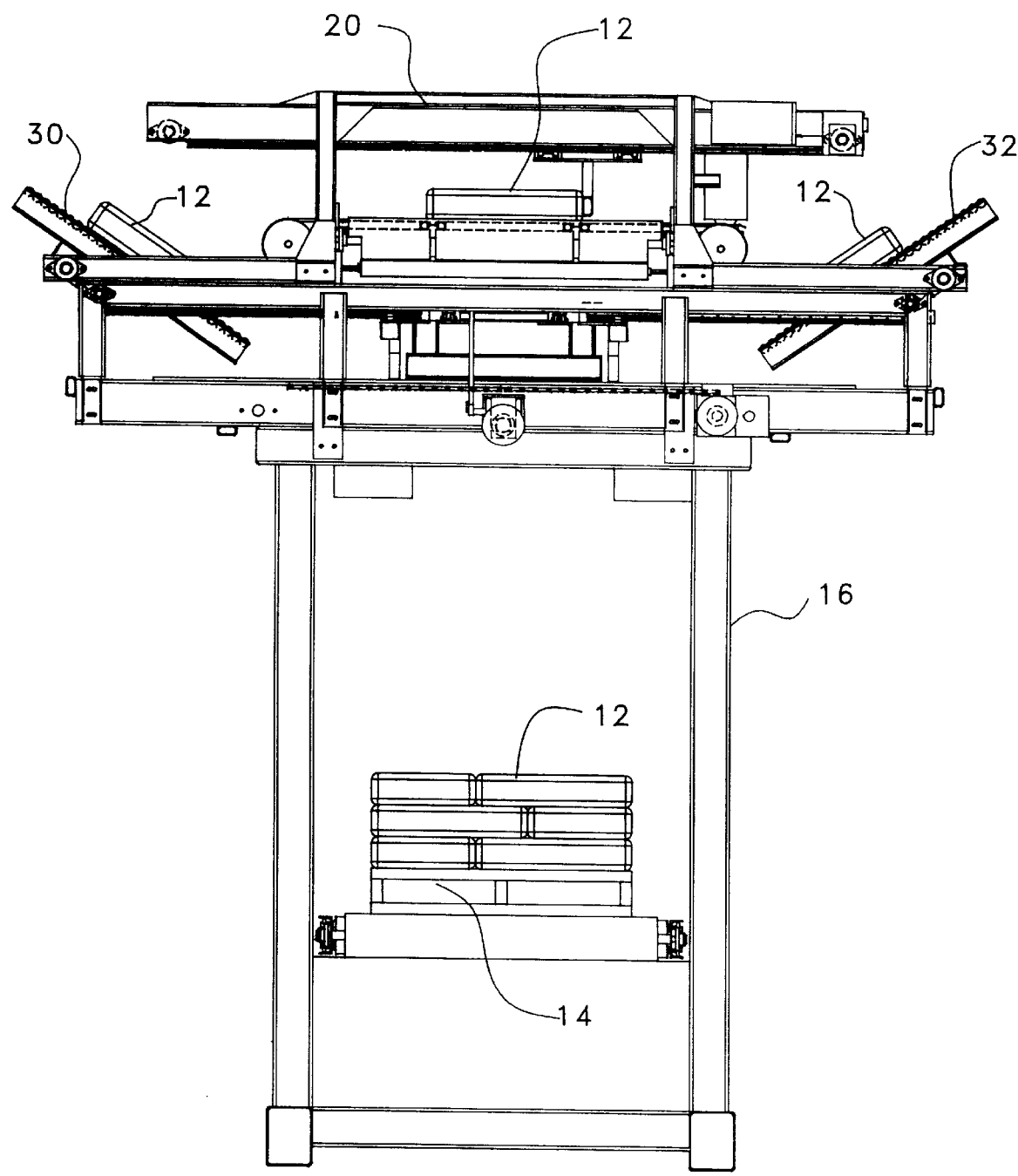
FIG. 11 is a side elevational view illustrating the material handling apparatus of FIG. 10.

In another embodiment of the present invention, as illustrated in FIGS. 8 and 9, the item assembling apparatus 10 has an item pushing assembly 34 for alternatingly transferring either a partial or complete layer of items 12 from item receiving forming conveyor 20 to either first side plate 30 or second side plate 32. The item pushing assembly 34 has a support frame 36, a track frame 38 supported by support frame 36, and a pushing mechanism 40 for traveling in alternating directions within track frame 38 above item receiving conveyor 20. The item pushing mechanism 34 includes at least one elongated bar 42 for contacting items 12 on item receiving conveyor 20. A motive force, such as an art known motor, pneumatic drive, or the like, drives elongated bar 42 to alternatingly transfer the partial layer of items 12 or the complete layer of items 12 from item receiving conveyor 20 to either first side plate 30 or second side plate 32.

As discussed above, the item assembling apparatus 10 of the present invention further has first side plate 30 located on a first side 44 of item receiving conveyor 20 and second side plate 32 located on a second side 46 of item receiving conveyor 20 opposite first side plate 30. The first side plate 30 and second side plate 32 preferably include a conveyor system 48 for assisting in completely moving items 12, once transferred from item receiving conveyor 20, onto first side plate 30 and second side plate 32, and for eventually transferring items 12 from first side plate 30 and second side plate 32, as will be discussed in further detail below. Furthermore, in another embodiment of the present invention, first side plate 30 and second side plate 32 can include a roller assembly.

Therefore, after a partial layer of items 12 or a complete layer of items 12 are deposited on item receiving conveyor 20, items 12, by action of belt members 26 or by action of item pushing assembly 34, with the assistance of conveyor system 48 of first side plate 30 and second side plate 32, are alternatingly transferred to either first side plate 30 or second side plate 32 in a direction generally perpendicular to infeed conveyor 22. It should be noted that items 12 can be transferred from item receiving conveyor 20 to either first side plate 30 only in a complete package layer, second side plate 32 only in a complete package layer, or both first side plate 30 and second side plate 32 in a partial package layer.

Figure 12:
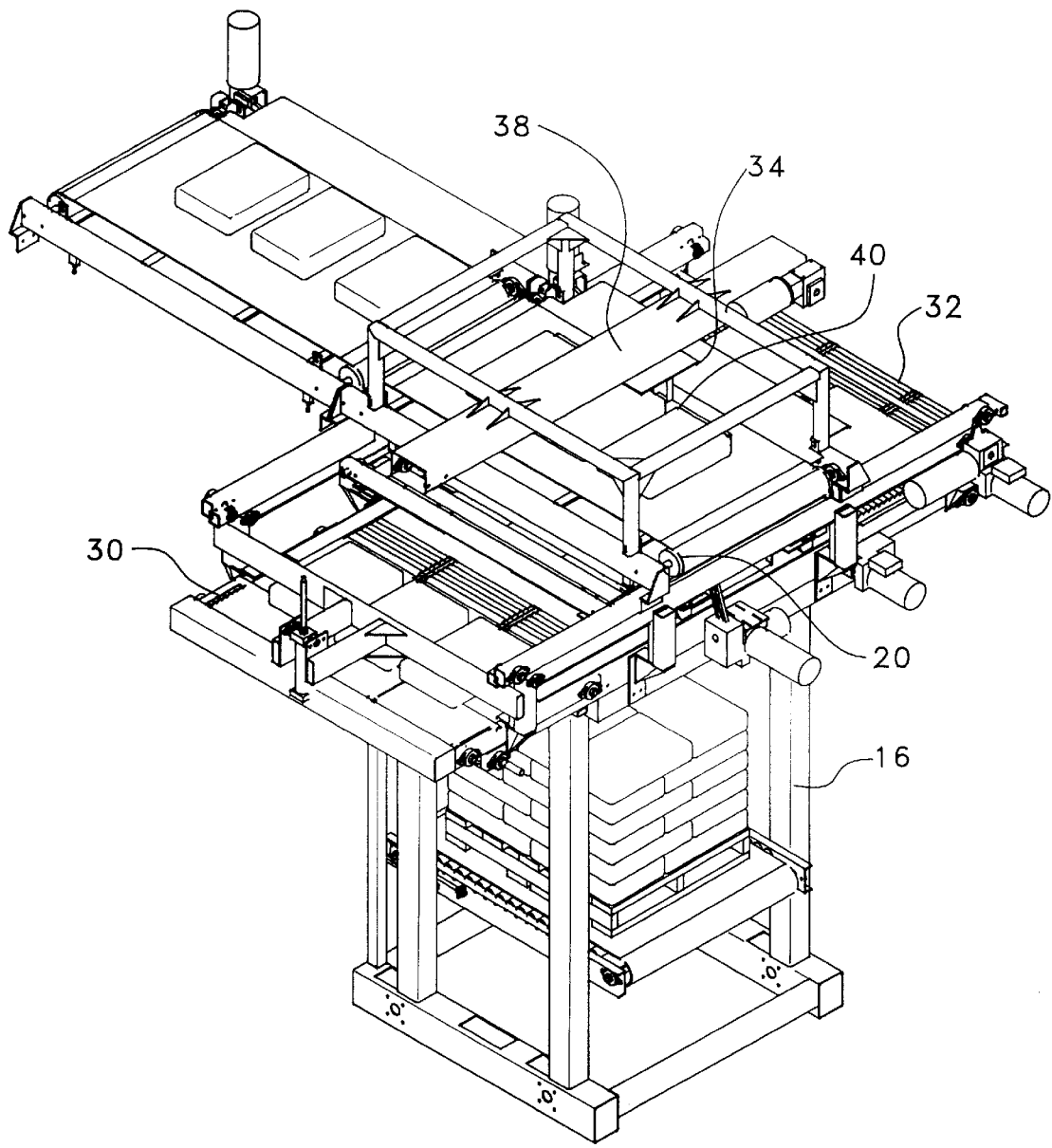
FIG. 12 is a side elevational view illustrating still another embodiment of the material handling apparatus for assembling an item layer onto a pallet in a multi-tiered stack, constructed in accordance with the material handling apparatus, showing the side plates lowered to the level of the layer forming plate so that items may be moved from the side area surfaces onto the layer forming plate to form an item layer thereon, and using a pusher mechanism to move items to the side plate area surfaces.
Figure 13:
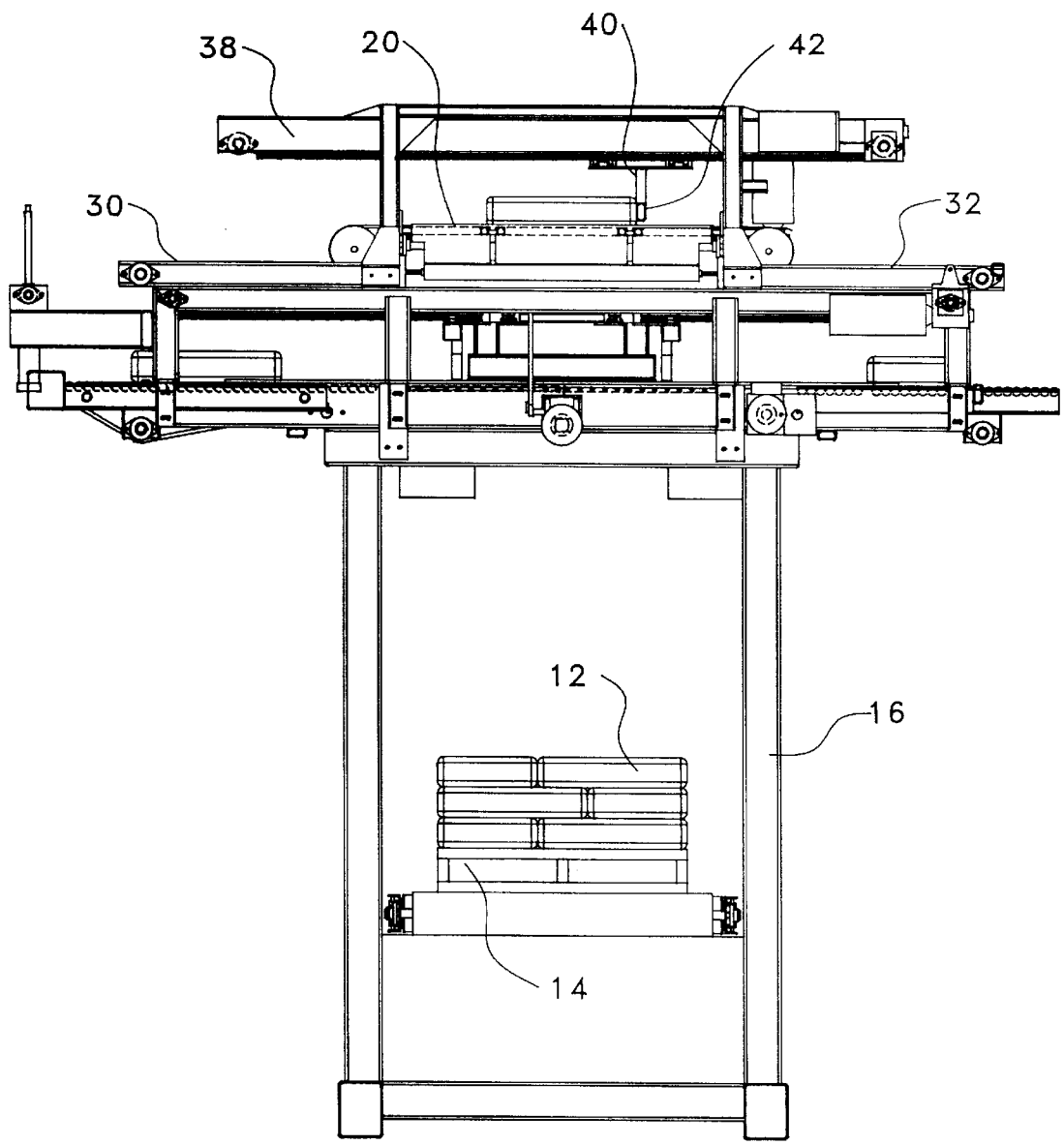
FIG. 13 is a side elevational view illustrating the material handling apparatus of FIG. 12.

In another embodiment of the item assembling apparatus 10 of the present invention, as illustrated in FIGS. 8, 12 and 13, first side plate 30 and second side plate 32 are vertically lowered to the level of item layer forming plates 52 while maintaining the horizontal leveling of first side plate 30 and second side plate 32. The conveyor system 48 of first side plate 30 and second side plate 32 is then activated to transfer items 12 to item layer forming plates 52.

A state-of-the-art programmable controller, preferably a software module, may be used to control the entire operation of the item layer assembling apparatus 10. For instance, the programmable controller controls feeding of items 12 from infeed conveyor 22 to item receiving conveyor 20, the transfer of the partial package layer or the complete package layer from item receiving conveyor 20 to first side plate 30 and/or second side plate 32, the transfer of the partial package layer or the complete package layer from first side plate 30 and/or second side plate 32 to item layer forming plates 52, the depositing of the formed package layer from item layer forming plates 52 to pallet 14, and so on. It should be noted that while the programmable controller has been described as a software module, it is within the scope of the present invention to utilize any programmable controller.

The item assembling apparatus 10 of the present invention provides a unique continuous package loading apparatus. As the item layer is being deposited on the pallet 14 from item layer forming plates 52, a new package layer is being assembled on item receiving conveyor 20 and first side plate 30 and/or second side plate 32. Providing continuous package loading allows item assembling apparatus 10 to load the items on the pallets 14 in less time than with conventional bag handling apparatuses.

It is therefore seen that the present invention provides item handling palletizer apparatus and methods for uninterrupted, continuous, loading and item layering of layers of items onto a pallet in a multi-tiered item layer.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

We claim:

1. Item layer assembly apparatus for continuously receiving items from a moving infeed conveyor carrying items and assembling an item layer from a plurality of items, all without the need to interrupt or modify the speed of the infeed conveyor, the item layer assembly apparatus comprising:

an item receiving area having a surface for continuously receiving items from a moving infeed conveyor;

one or more side plate area having a surface and a side adjacent and substantially horizontally planar to said item receiving area surface;

means for moving items from said item receiving area surface onto said one or more side plate area surface;

means for activating said means for moving items from said item receiving area surface onto said one or more side plate area surface when a predetermined number of items are received on said item receiving area surface to thereby remove items from said item receiving area surface before said item receiving area surface overflows or allows items on the infeed conveyor to stop or backup, or requires the infeed conveyor to stop or alter the speed at which it feeds items onto said one or more item receiving area surface;

a layer forming plate positioned directly underneath said item receiving area surface; and means for moving items from said one or more side plate area surface to said layer forming plate to form an item layer;

means for activating said means for moving items from said one or more side plate area surface to said layer forming plate to form an item layer;

whereby, a plurality of items carried by a moving infeed conveyor can be formed into an item layer without the need to stop or alter the speed at which the infeed conveyor feeds items.

2. The item layer assembly apparatus of claim 1 wherein said item receiving area surface includes a plurality of rollers through its surface.

3. The item layer assembly apparatus of claim 2 and further comprising a rotatable belt member between at least two of said rollers, said rotatable belt being positioned to contact items on said item receiving area surface to move items from said item receiving area surface to said one or more side plate area surface.

4. The item layer assembly apparatus of claim 1 and further comprising a first side plate area surface and a second side plate area surface.

5. The item layer assembly apparatus of claim 1 wherein each of said one or more side plate area surface includes an item conveyor system.

6. The item layer assembly apparatus of claim 5 wherein said item conveyor system included in each of said one or more side plate area surface includes a roller assembly.

7. The item layer assembly apparatus of claim 1 wherein said means for activating said means for moving items from said one or more side plate area surface to said layer forming plate to form an item layer includes a pivot means for each of said one or more side plate area surface for controllably allowing said side of each said one or more side plate area surface adjacent said item receiving area surface to pivot downwardly, whereby items on each said one or more side plate area surface move onto said layer forming plate to form an item layer on said layer forming plate.

8. The item layer assembly apparatus of claim 1 wherein said means for activating said means for moving items from said one or more side plate area surface to said layer forming plate to form an item layer includes means for lowering said one or more side plate area surface substantially horizontally planar to said layer forming plate, and still further comprising additional means for moving items on said one or more side plate area surface onto said layer forming plate to form an item layer on said layer forming plate.

9. The item layer assembly apparatus of claim 1 further includes means for lowering and raising said layer forming plate.

10. The item layer assembly apparatus of claim 1 wherein a pallet is located below said layer forming plate, said layer forming plate includes a first layer forming plate portion and a normally adjacent second layer forming plate portion, and further comprising means for retracting and separating said first layer forming plate portion from said second layer plate forming portion, and wherein when said first layer forming plate portion and said second layer plate forming portion are retracted and separated from one another, an item layer carried by said layer forming plate is deposited on to the pallet located below said layer forming plate.

11. Item layer assembly apparatus for continuously receiving items from a moving infeed conveyor carrying items and assembling an item layer from a plurality of items, and depositing them on a pallet located below the item layer assembly apparatus, all without the need to interrupt or modify the speed of the infeed conveyor, the item layer assembly apparatus comprising:

an item receiving area having a surface for continuously receiving items from a moving infeed conveyor;

first and second side plate areas, each side plate area having a surface and side adjacent and substantially horizontally planar to said item receiving area surface, said first and second side plate area surfaces including a roller assembly item conveyor system;

said item receiving area surface including a plurality of rollers through its surface, and further including a rotatable belt member between at least two of said rollers, said rotatable belt being positioned to contact items on said item receiving area surface to move items from said item receiving area surface to said first and second side plate area surfaces;

means for moving items from said item receiving area surface onto said first and second side plate area surfaces;

means for activating said means for moving items from said item receiving area surface onto said first and second side plate area surfaces when a predetermined number of items are received on said item receiving area surface to thereby remove items from said item receiving area surface before said item receiving area surface overflows or allows items on the infeed conveyor to stop or backup, or requires the infeed conveyor to stop or alter the speed at which it feeds items onto said first and second side plate area surfaces;

a layer forming plate positioned below said item receiving area surface, wherein said layer forming plate includes a first layer forming plate portion and a normally adjacent second layer forming plate portion;

means for moving items from said first and second side plate area surfaces to said layer forming plate to form an item layer;

means for activating said means for moving items from said first and second side plate area surfaces to said layer forming plate to form an item layer, wherein said means for activating said means for moving items from said first and second side plate area surfaces to said layer forming plate to form an item layer includes a pivot means for each of said first and second side plate area surfaces for controllably allowing said side of each said first and second side plate area surfaces adjacent said item receiving area surface to pivot downwardly, whereby items on each said first and second side plate area surfaces move onto said layer forming plate to form an item layer on said layer forming plate;

means for retracting and separating said first layer forming plate portion from said second layer plate forming portion, and wherein when said first layer forming plate portion and said second layer plate forming portion are retracted and separated from one another, an item layer carried by said layer forming plate is deposited on to a pallet located below said layer forming plate of said item layer assembly apparatus;

whereby, a plurality of items carried by a moving infeed conveyor can be formed into an item layer deposited on to a pallet without the need to stop or alter the speed at which the infeed conveyor feeds items.

* * * * *